(12) United States Patent
Fujikawa et al.

(10) Patent No.: US 7,066,652 B2
(45) Date of Patent: Jun. 27, 2006

(54) EXTERNALLY PRESSURIZED GAS BEARING AND SPINDLE EQUIPMENT USING THIS

(75) Inventors: Yoshio Fujikawa, Iwata (JP); Kiyotaka Kusunoki, Iwata (JP); Kazuyuki Aono, Iwata (JP); Ryu Inoue, Iwata (JP)

(73) Assignee: NTN Corporation, Osaka-Fu (JP)

( * ) Notice: Subject to any disclaimer, the term of this patent is extended or adjusted under 35 U.S.C. 154(b) by 0 days.

(21) Appl. No.: 10/411,077

(22) Filed: Apr. 9, 2003

(65) Prior Publication Data

US 2004/0109622 A1   Jun. 10, 2004

(30) Foreign Application Priority Data

Apr. 11, 2002 (JP) ............... 2002-109288

(51) Int. Cl.
*F16C 32/06* (2006.01)

(52) U.S. Cl. .................................... 384/107
(58) Field of Classification Search ........... 384/100, 384/107

See application file for complete search history.

(56) References Cited

U.S. PATENT DOCUMENTS

| | | | | |
|---|---|---|---|---|
| 3,049,383 A | * | 8/1962 | Loch | 384/100 |
| 3,588,197 A | * | 6/1971 | Barnett | 384/107 |
| 3,617,102 A | * | 11/1971 | Wada et al. | 384/107 |
| 5,073,037 A | * | 12/1991 | Fujikawa et al. | 384/120 |
| 6,019,515 A | * | 2/2000 | Fujii et al. | 384/107 |
| 6,328,475 B1 | * | 12/2001 | Jager | 384/107 |
| 6,439,773 B1 | * | 8/2002 | Fujikawa et al. | 384/100 |

* cited by examiner

*Primary Examiner*—Thomas R. Hannon
(74) *Attorney, Agent, or Firm*—J.C. Patents

(57) ABSTRACT

An externally pressurized gas bearing comprising a main shaft, and journal bearing sections having a plurality of axial gas feed rows each having a plurality of circumferentially equispaced gas feed holes, the gas feed holes in the gas feed rows being adapted to spout compressed gas to thereby rotatably radially support the main shaft in a non-contact state, the externally pressurized gas bearing being arranged so that the gas feed holes in the gas feed row are disposed so as to be positioned circumferentially intermediate between gas feed holes in the adjoining gas feed row.

8 Claims, 6 Drawing Sheets

EXTERNALLY PRESSURIZED GAS BEARING AND SPINDLE EQUIPMENT USING THIS

BACKGROUND OF THE INVENTION

1. Field of the Invention

The present invention relates to an externally pressurized gas bearing incorporated, for example, into a precision processing machine or inspection device to support the main shaft in a non-contact state, and it also relates to a spindle device using this.

2. Brief Description of the Prior Art

An externally pressurized gas bearings, which supports the main shaft in a non-contact state with respect to the bearing surface, has a high degree of rotation accuracy, and is used in the work spindle device or tool spindle device of a precision processing machine or precision inspection device. Prior art examples of such externally pressurized gas bearing and a spindle device using this are shown in FIG. 9.

This externally pressurized gas bearing comprises bearing sleeves 4, 5 and 6 fixed in a housing 3 by a suitable means, a main shaft 1 that is radially supported in a non-contact state through a fine bearing clearance by journal bearing sections 7 and 8 formed by the two bearing sleeves 4 and 5, and that is axially supported in a non-contact state through a fine bearing clearance by a pair of thrust bearing sections 9 and 10 formed by holding a thrust plate 2 integral with the main shaft 1 between two bearing sleeves 5 and 6 from opposite surfaces. A spindle device having this externally pressurized gas bearing is provided with a driving source 22 coaxial with the main shaft 1, said driving source 22 having a motor rotor 11 integrally attached to the main shaft 1 and adapted to rotate the main shaft 1 by a driving force produced by an electromagnetic force acting between itself and a motor stator 12.

The bearing sleeves 4 and 5 constituting the journal bearing sections 7 and 8 are respectively provided with two gas feed rows 23 each having a plurality of circumferentially equispaced fine gas feed holes 13 that open to the bearing surface opposed to the main shaft 1. Further, the outer surface of the main shaft 1 is formed with circumferential grooves 18 at positions opposed to two gas feed rows 23 formed in the bearing sleeves 4 and 5.

The bearing sleeves 5 and 6 constituting the thrust bearing sections 9 and 10 are respectively provided with a single circumferential gas feed row 24 having a plurality of circumferentially equispaced fine gas feed holes 14 that open to the bearing surface opposed to the thrust plate 2. In some cases, in order to increase the static stiffness of the thrust bearing sections 9 and 10, a circumferential groove is formed that connects gas feed holes 14 in the gas feed row 24 formed in the bearing sleeves 5 and 6.

In this externally pressurized gas bearing, when compressed gas is fed from a bearing gas feed port 15, it flows into the bearing clearances in the journal bearing sections 7 and 8 and thrust bearing sections 9 and 10 from the gas feed holes 13 and 14 in the gas feed rows 23 and 24 via a gas feed passageway 16 formed in the housing 3, and a load carrying force of bearing is produced that balances with the self-weight of the main shaft 1 and external load by the pressure of the compressed gas in the bearing clearances. With these journal bearing sections 7 and 8 and thrust bearing sections 9 and 10, the main shaft 1 is driven for rotation while being supported in a non-contact state, whereby a highly accurate rotary motion is realized. In addition, the gas flowing out of the journal bearing sections 7 and 8 and thrust bearing sections 9 and 10 is discharged to the outside of the housing 3 directly from the bearing ends or through exhaust passageways 17.

A seal sleeve 19 is disposed between the bearing sleeves 4 and 5. This seal sleeve 19 is formed in its inner and outer surfaces with suction holes 25 extending between the inner and outer surfaces and a circumferential groove 26 communicating with the suction holes 25. An suction passageway 21 formed in the main shaft 1 and a suction passageway 20 formed in the housing 3 communicate with each other through the suction holes 25 and circumferential groove 26. The opposite sides of the circumferential groove 26 formed in the inner surface of the seal sleeve 19 are opposed to the outer diameter surface of the main shaft 1 through the same fine seal clearance as the bearing clearance in the journal bearing sections 7 and 8, thus presenting a non-contact seal construction.

In using this spindle device, a vacuum chuck (not shown) or the like is attached to the front end of the main shaft 1, and is used by evacuating the device through the exhaust passageway 21 in the main shaft 1 via the seal sleeve 19 by an external vacuum pump (not shown) connected to the exhaust passageway 20.

In this connection, the radial runout accuracy of the main shaft 1 is influenced mainly by the characteristics of the journal bearing sections 7 and 8. Further, since decreasing the bearing clearance is effective in increasing the stiffness and damping coefficient of the externally pressurized gas bearing, it is common practice to set the bearing clearance at as small a value as possible within the range that is permitted by other factors and to determine the size and number of the gas feed holes 13 and the axial position of the gas feed rows 23 so that the bearing stiffness may be greatest with this clearance. In this case, if the bearing clearance is decreased, the resistance of the bearing clearance to the flow of the compressed gas increases, and it becomes necessary to correspondingly increase the resistance of the gas feed holes 13, which means that the diameter of the gas feed holes 13 should be minimized and the number of gas feed holes should be decreased.

Further, no special consideration has heretofore been paid to the circumferential position of the gas feed holes 13 in the gas feed rows 23 in the journal bearing sections 7 and 8. Thus, the gas feed holes 13 in the two gas feed rows 23 in the journal bearing sections 7 and 8 are disposed in the same phase (the same circumferential position), and the phase relationship of the gas feed holes 13 in the journal bearing sections 7 and 8 are not specially prescribed in most cases.

In recent years, as semiconductors and information mediums become increasingly densified and increasingly microscopic in structure, it has been desired to further improve the runout accuracy of the main shaft for the externally pressurized gas bearing in consideration of the fact that particularly the radial runout of the main shaft has a great influence on the test and processing accuracies. Concerning the main shaft runout accuracy of this externally pressurized gas bearing, it has been theoretically shown, when an externally pressurized gas bearing of inherent restrictor type having a single gas feed row without a circumferential groove is used as a subject of analysis (bearing model), that radial runout is produced during rotation of the main shaft by the generation of exciting force of particular frequency caused by the interaction between the number of gas feed holes and the main shaft shape (roundness error), as disclosed in "Fundamental Study on Rotation Accuracy Characteristics of Externally Pressurized Gas Journal Bearings (second report, Shaft Rotation Accuracy Characteristics)" (Transaction of the JSME (Series C), Vol. 58, No. 548 (1992–4), pp. 1177–1183).

This paper points out that in the case where the number of gas feed holes constituting the gas feed row is k, there is a possibility that radial runout of the main shaft having a frequency equal to n k±1 (where n=1, 2, . . . ) times the rotation speed will occur due to the interaction with the roundness error of the main shaft. Concerning the influences of rotation speed of the main shaft, it is also shown that if the rotation speed increases until the frequency of runout of the main shaft exceeds the resonance point, the amplitude of runout decreases. Theoretically, therefore, it is presumed that the externally pressurized gas bearing that is provided with the two gas feed rows 23 and circumferential groove 18 as shown in FIG. 9 will induce the same phenomenon.

In order to reduce the runout of the main shaft due to interaction between the number of gas feed holes and the main shaft shape (roundness error), the provision of the circumferential groove 18 in the outer surface of the main shaft 1, as shown in FIG. 9, combined with the increased clearance in the gas feed hole outlet port and the circumferential leveling of pressure in the bearing clearance, can be expected to produce some effect. In order to produce a further effect in consideration of the fact that it is desired to further improve the runout accuracy of the main shaft 1 for the externally pressurized gas bearing as semiconductors and information mediums become increasingly densified and increasingly microscopic in structure, if the number k of gas feed holes in one gas feed row is increased until k−1 times of the specified rotation speed exceeds the resonant speed of the spindle device, then it is possible to reduce the amplitude of the runout. However, increasing the number of gas feed holes requires increasing the bearing clearance, resulting in incurring decreases in the bearing stiffness and in damping coefficient and an increase in the consumption of compressed gas. Particularly, decreases in stiffness and in damping coefficient present the problem of increasing the runout of the main shaft due to disturbance vibration.

SUMMARY OF THE INVENTION

Accordingly, an object of the present invention, which has been proposed in view of the above problems, is to provide an externally pressurized gas bearing, which, while securing the same static stiffness and compressed gas consumption as in the prior art, can improve the runout accuracy of the externally pressurized gas bearing, and to provide a spindle device using this.

The present invention provides an externally pressurized gas bearing comprising a main shaft, and a journal bearing section having a plurality of gas feed rows each having a plurality of circumferentially equispaced gas feed holes, said gas feed holes in the gas feed rows being adapted to spout compressed gas to thereby rotatably radially support said main shaft in a non-contact state, said externally pressurized gas bearing being characterized in that said gas feed holes in the gas feed rows are staggered for each gas feed row so as to be positioned circumferentially intermediate between gas feed holes in the adjoining gas feed row.

Normally, the outer surface of a main shaft is processed by a cylindrical grinder and the runout of the work spindle of the cylindrical grinder is transferred as a roundness error of the main shaft; therefore, the main shaft has substantially the same cross-sectional shape (roundness error) in axially different positions. Therefore, by staggering, for each gas feed row, the gas feed holes in the plurality of gas feed rows in the journal bearing sections so as to be positioned circumferentially intermediate between gas feed holes in the adjoining gas feed row, it is possible to increase the apparent number of gas feed holes in the circumference.

An increase in the apparent number of gas feed holes effected by such disposition results in an increase in the frequency of the exciting applying force due to the roundness error of the main shaft, and this frequency can be easily set on the higher frequency side than the resonant speed of the spindle device. Thereby, as the damping action of the bearing effectively acts for the runout with a higher frequency than the resonant speed, the amplitude of the runout can be reduced. In this case, the number of gas feed holes is actually the same as in the prior art, so that the same performance as in the prior art can be maintained concerning bearing stiffness, damping coefficient, and compressed gas consumption. For this reason, the damping effect of the bearing effectively develops to reduce the runout of the main shaft, so that while securing the same static stiffness and compressed gas consumption as in the prior art, it is possible to improve the runout accuracy of the externally pressurized gas bearing and to realize a highly accurate rotary motion.

In addition, it is desirable that the gas feed holes of said gas feed rows be disposed in terms of their circumferential positions so that they are symmetrical on both sides of the middle in the direction of disposition of said gas feed rows. With this disposition, since the exciting force of the runout of the main shaft due to interaction between the number of gas feed holes and the main shaft shape (roundness error) takes place symmetrically on both sides of the middle in the direction of disposition of the gas feed rows, the inclination of the main shaft due to the exciting force can be controlled to assume a minimum value. Therefore, the rotation accuracy of the work or tool attached to the front end of the main shaft is further improved. Further, providing a plurality of journal bearing sections and their feed rows in a single bearing member eliminates the operation of mutually positioning journal bearing sections, reduces the assembly man-hours, and ensures that the circumferential positional error between the journal bearing sections is reduced.

The externally pressurized gas bearing consisting of said arrangement constitutes a spindle device by having a thrust bearing section opposed to a thrust plate connected to said main shaft for axially supporting the main shaft, and a drive source for rotating the main shaft of the externally pressurized gas bearing.

DESCRIPTION OF THE PREFERRED EMBODIMENTS OF THE INVENTION

Figure 1:
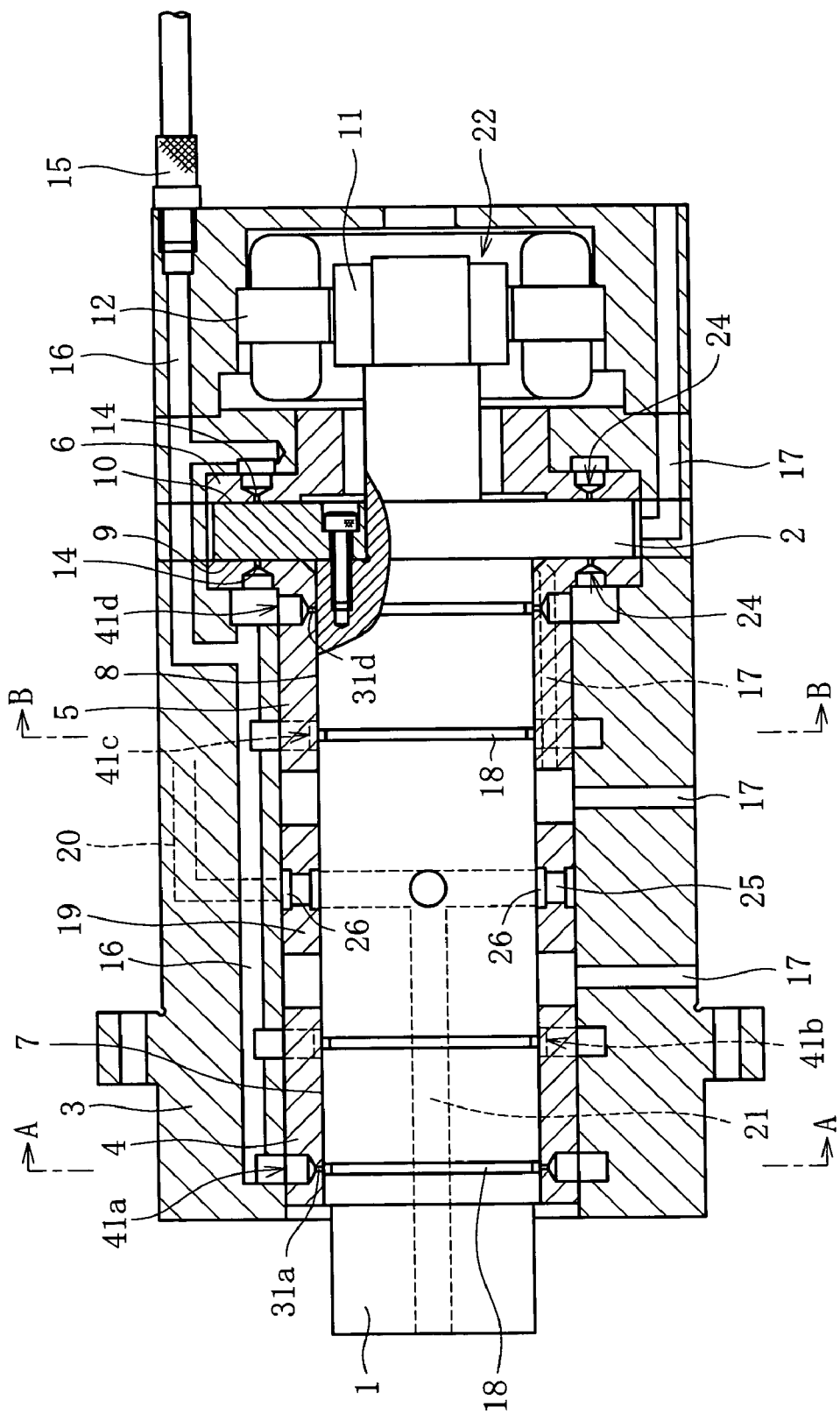
FIG. 1 is a sectional view showing an embodiment of the invention.
Figure 9:
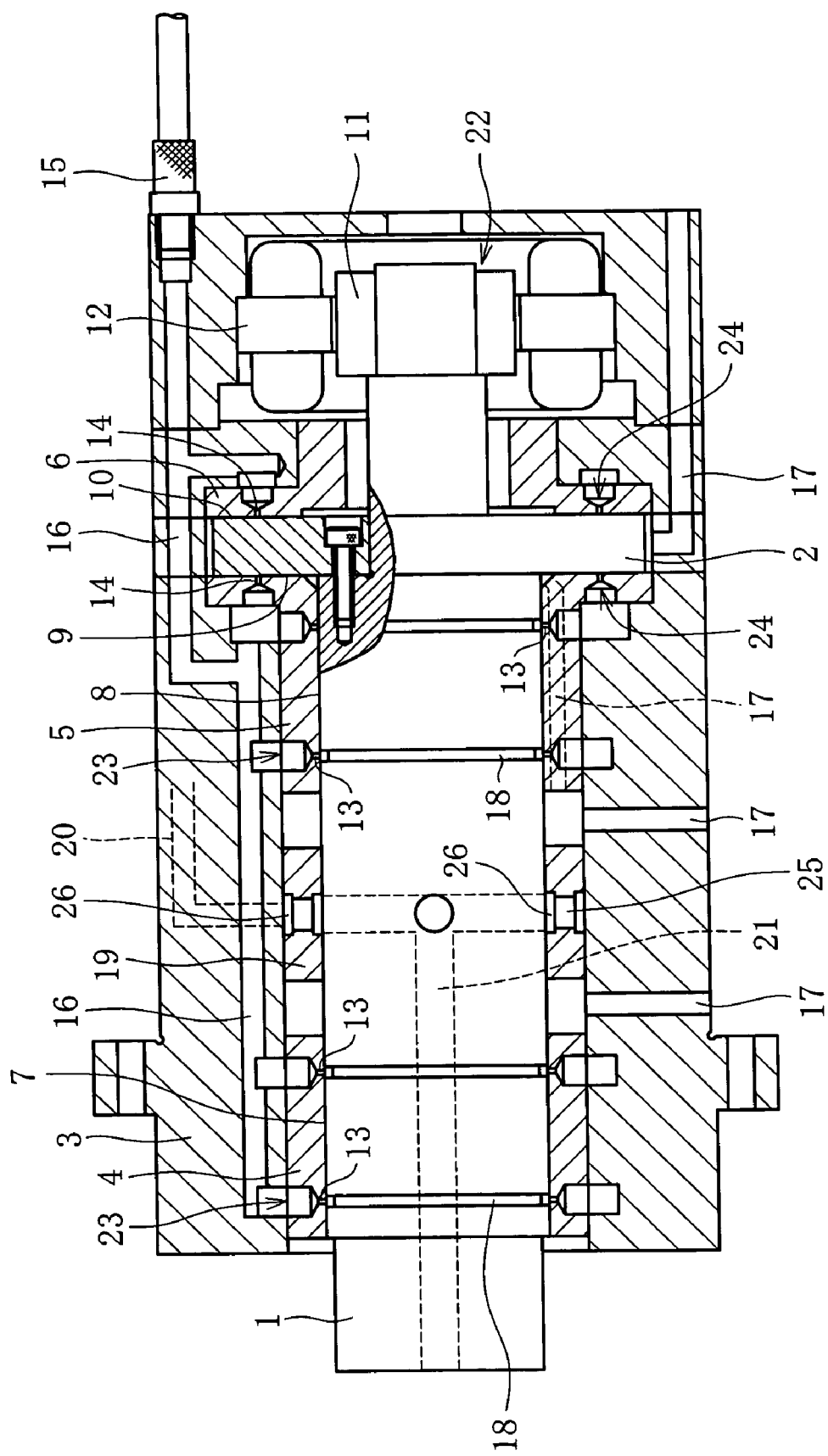
FIG. 9 is a sectional view showing a prior art example of an externally pressurized gas bearing and a spindle device.

FIG. 1 shows an embodiment of the present invention. In addition, the same portions as in FIG. 9 are given the same reference characters. An externally pressurized gas bearing in this embodiment comprises bearing sleeves 4, 5 and 6 fixed to a housing 3 by a suitable means, a main shaft 1 radially supported in a non-contact state through a fine bearing clearance by journal bearing sections 7 and 8 formed by the two bearing sleeves 4 and 5, the main shaft 1 being also axially supported in a non-contact state through a fine bearing clearance by a pair of thrust bearing sections 9 and 10 formed in that a thrust plate 2 integral with the main shaft 1 is held at its opposite surfaces between the two bearing sleeves 5 and 6.

A spindle device having this externally pressurized gas bearing is provided with a drive source 22 coaxial with the main shaft 1, said drive source 22 having a motor rotor 11 integrally attached to the main shaft 1, thus rotating the main shaft 1 by a driving force produced by an electromagnetic force acting between it and a motor stator 12. As the motor, use is made of a brushless motor, such as a synchronous or inductive AC motor in order to make the best use of the feature of the externally pressurized gas bearing supporting the main shaft 1 in a non-contact state. In addition, in the case of using an AC servomotor, a sensor is required for detecting the angle of rotation of the main shaft 1, and a rotary encoder (not shown) is attached as by extending the main shaft 1 rightward in the drawing.

The bearing sleeves 4 and 5 constituting the journal bearing sections 7 and 8 are provided with two gas feed rows 41a, 41b and 41c, 41d having pluralities of circumferentially equispaced fine gas feed holes 31a, 31b and 31c, 31d, respectively, that open to the bearing surface opposed to the main shaft 1. Further, the outer surface of the main shaft 1 is provided with circumferential grooves 18 in positions where they are opposed to the two gas feed rows 41a, 41b and 41c, 41d formed in the bearing sleeves 4 and 5, respectively. Such relatively simple construction increases the static stiffness of the journal bearing sections 7 and 8.

In addition, the bearing sleeves 5 and 6 constituting the thrust bearing sections 9 and 10 are respectively provided, as in the prior art, with one circumferential gas feed row 24 having a plurality of circumferentially equispaced fine holes 14 that open to the bearing surface opposed to the thrust plate 2. In order to increase the static stiffness of the thrust bearing sections 9 and 10, there are cases where circumferential grooves are provided in such a manner as to connect the gas feed holes 14 in the gas feed row 24 formed in the bearing sleeves 5 and 6.

In this externally pressurized gas bearing, when compressed gas is fed from the bearing gas feed port 15, it flows from the gas feed holes 31a–31d and 14 in the gas feed row 41a–41d and 24 via the gas feed passageway 16 formed in the housing 3 into the bearing clearances in the journal bearing sections 7 and 8 and thrust bearing sections 9 and 10, whereupon the pressure of the compressed gas in the bearing clearances produces a load carrying force that balances with the self-weight of the main shaft 1 and external load. Thus, a highly accurate rotary motion is realized by rotation-driving the main shaft 1 while supporting it in a non-contact state by means of the journal bearing sections 7 and 8 and thrust bearing sections 9 and 10. In addition, the gas flowing out of the journal bearing sections 7 and 8 and thrust bearing sections 9 and 10 is discharged outside the housing 3 directly from the bearing end or through the exhaust passageway 17.

A seal sleeve 19 is disposed between the bearing sleeves 4 and 5. This seal sleeve 19 is provided at the inner and outer surfaces thereof with an exhaust hole 25 extending between the inner and outer surfaces and a circumferential groove 26 communicating with said exhaust hole 25, respectively. The suction passageway 21 formed in the main shaft and the suction passageway 20 formed in the housing 3 communicate with each other through the suction hole 25 and circumferential groove 26. The opposite sides of the circumferential groove 26 formed in the inner surface of the seal sleeve 19 are opposed to the outer surface of the main shaft 1 through fine seal clearances equivalent to the bearing clearances in the journal bearing sections 7 and 8, presenting a non-contact seal construction.

This spindle device is used by fixing a work or a tool on the vacuum chuck (not shown) or the like attached to the front end of the main shaft 1 by evacuation through the exhaust passageway 21 in the main shaft 1 via the seal sleeve 19 by an external vacuum pump (not shown) connected to the exhaust passageway 20.

Figure 2:
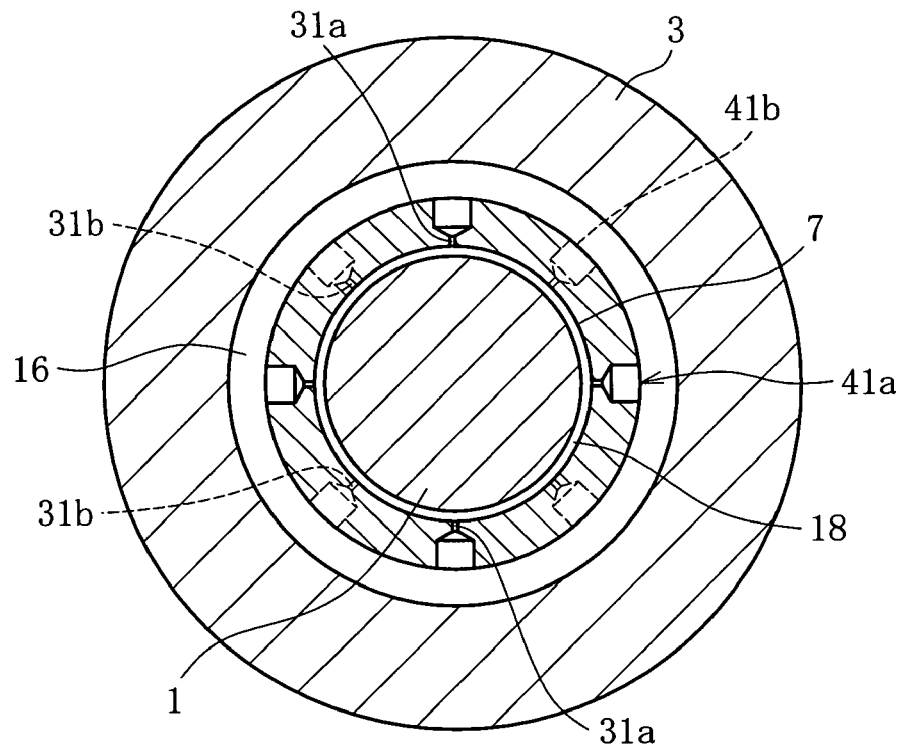
FIG. 2 is a sectional view taken along the line A—A in FIG. 1.
Figure 3:
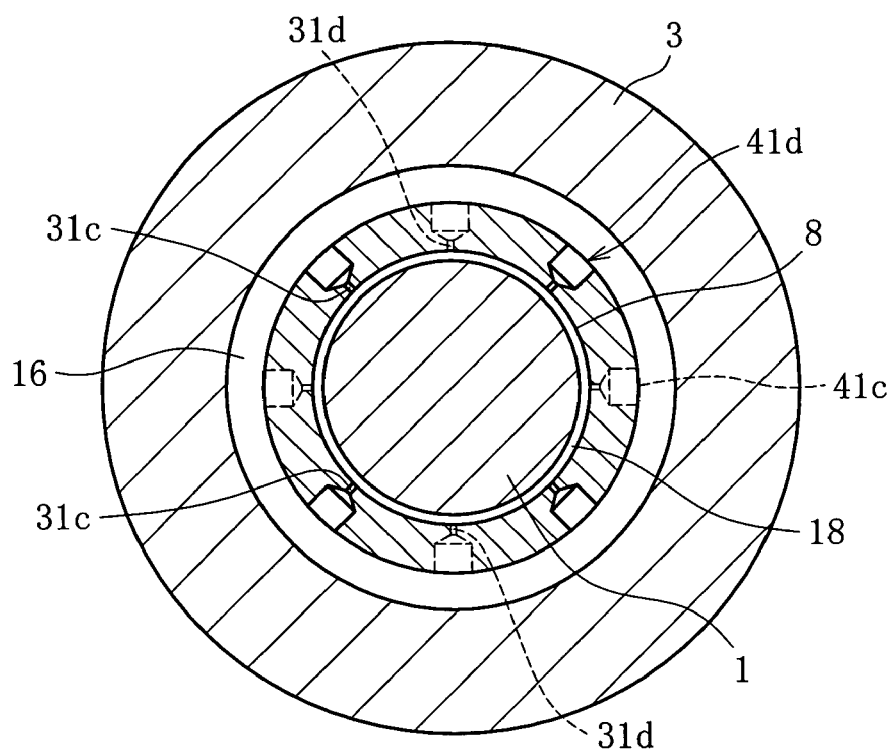
FIG. 3 is a sectional view taken along the line B—B in FIG. 1.

In this embodiment, the gas feed holes 31a and 31b in the gas feed rows 41a and 41b in the journal bearing section 7 in the bearing sleeve 4 are disposed as shown in FIG. 2 and the gas feed holes 31c and 31d in the gas feed row 41c and 41d in the journal bearing section 8 in the bearing sleeve 5 are disposed as shown in FIG. 3. As shown in the same figures, the gas feed holes 31b in the gas feed row 41b are disposed circumferentially intermediate between the gas feed holes 31a in the gas feed row 41d, and the gas feed holes 31d in the gas feed row 41d are disposed circumferentially intermediate between the gas feed holes 31c in the gas feed row 41c. That is, it follows that the gas feed holes 31b in the gas feed row 41b are disposed at positions that are circumferentially phase-shifted by 45° from the positions of the gas feed holes 31a in the gas feed row 41a and that, likewise, the gas feed holes 31d in the gas feed row 41d are disposed at positions that are circumferentially phase-shifted by 45° from the positions of the gas feed holes 31c in the gas feed row 41c.

In this case, the journal bearing surface of the main shaft 1 is processed by a cylindrical grinder, and the axial runout of the work spindle of the cylindrical grinder is transferred as a roundness error of the main shaft 1. The main shaft 1 has substantially the same cross-sectional shape (roundness error) in axially different positions. Therefore, by disposing the gas feed holes 31a and 31c in the plurality of gas feed rows 41a and 41c in the journal bearing sections 7 and 8 so as to be positioned circumferentially intermediate between gas feed holes 31b and 31d in the adjoining gas feed rows 41b and 41d, the relationship between the roundness error of the main shaft 1 and the number of gas feed holes 31a–31d becomes apparently substantially the same as when the number of gas feed holes 31a–31 d on the circumference is doubled.

Thus, despite the fact that the number of gas feed holes 31a–31d is actually the same as in the prior art, the aforesaid disposition apparently increases the number of gas feed holes 31a–31d, and the frequency of the exciting force in runout of the main shaft caused by the interaction between the main shaft shape (roundness error) and the gas feed holes 31a–31d increases to about twice as large as in the case where the gas feed holes 13 are disposed circumferentially in the same phase (same circumferential positions) as in the prior art, and this frequency can be easily set on the higher frequency side than at the resonant speed of the spindle device. Thereby, since the damping action of the bearing effectively develops for a runout that has a higher frequency than at the resonant speed, the amplitude of the axial runout can be reduced, thus realizing highly accurate rotation driving. In addition, since the number of gas feed holes 31a–31d is actually the same as in the prior art, the same bearing stiffness, damping coefficient, and compressed gas consumption as in the prior art can be retained.

In the two journal bearing sections 7 and 8, the gas feed holes 31a–31d in the gas feed rows 41a–41d are disposed in terms of their circumferential positions so that they are symmetrical on both sides of the middle in the direction of disposition of the gas feed rows. That is, as shown in FIGS. 2 and 3, the gas feed holes 31a and 31b in the gas feed rows 41a and 41b in the bearing sleeve 4, and the gas feed holes 31c and 31d in the gas feed rows 41c and 41d in the bearing sleeve 5 are bilaterally symmetrical, as seen in a direction normal to the axis, on both sides of the axial middle position of the seal sleeve 19 disposed in the middle in the direction of disposition of the gas feed rows. Thereby, the exciting force produced during main shaft rotation by the interaction between the main shaft shape and the number of gas feed holes are produced bilaterally symmetrically on both sides of the middle in the direction of disposition of the gas feed rows; therefore, the inclination of the main shaft 1 due to the exciting force can be controlled to assume a minimum value and the runout at the front end of the main shaft to which work, a tool or the like is attached can be made smaller.

In the embodiment shown in FIG. 1, in the journal bearing sections 7 and 8, a description has been given of the case where the two bearing sleeves 4 and 5 for two-row gas feed are disposed side by side. However, the number of bearing sleeves may be three or more, and the number of gas feed rows in each bearing sleeve may be three or more. Further, a plurality of bearing sleeves each having a single gas feed row may be axially disposed, and the gas feed holes in the gas feed row in each bearing sleeve may be shifted in phase for every gas feed row. Further, the number of gas feed holes per gas feed row is not limited to four.

Figure 4:
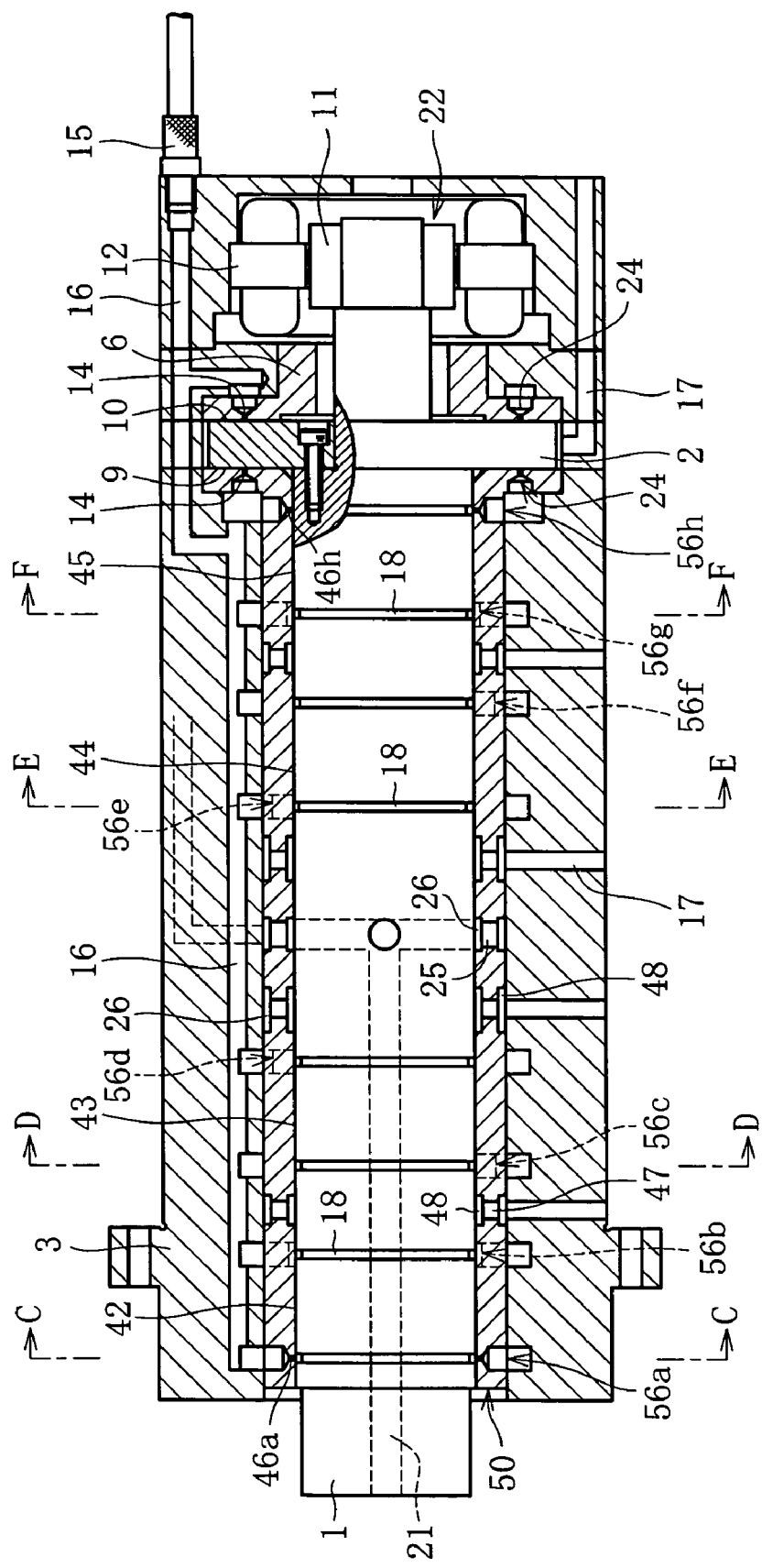
FIG. 4 is a sectional view showing another embodiment of the invention.
Figure 5:
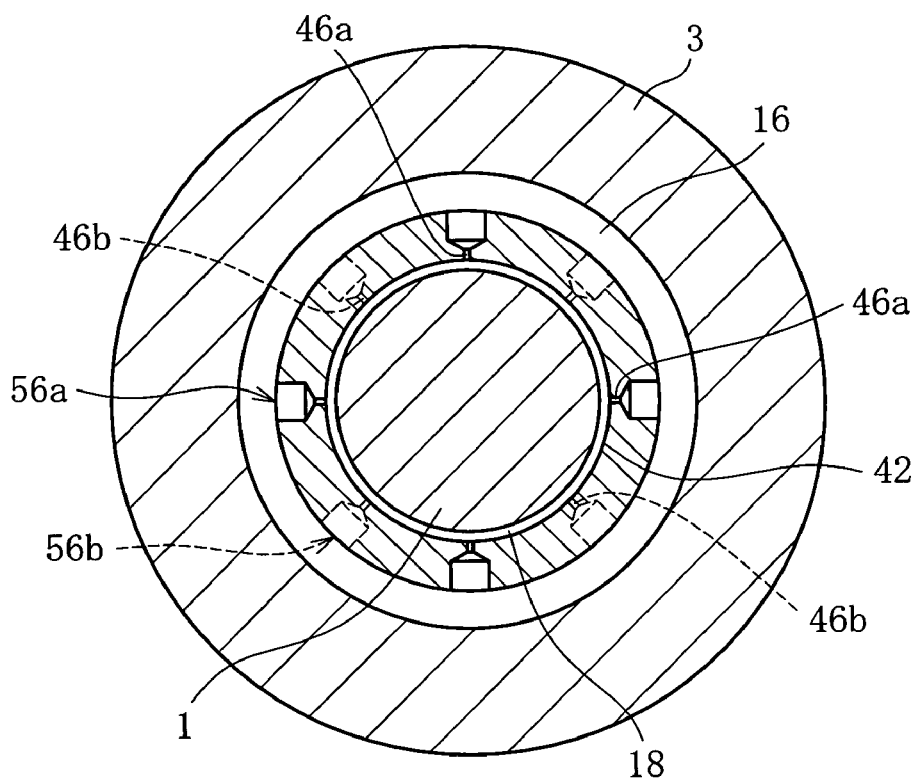
FIG. 5 is a sectional view taken along the line C—C in FIG. 3.
Figure 6:
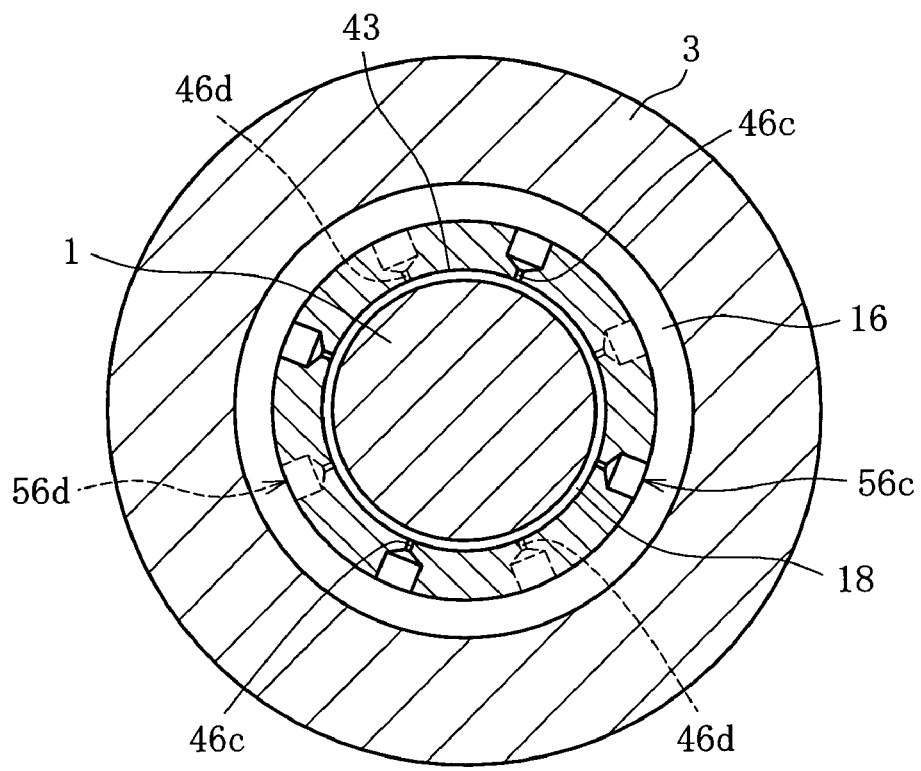
FIG. 6 is a sectional view taken along the line D—D in FIG. 3.
Figure 7:
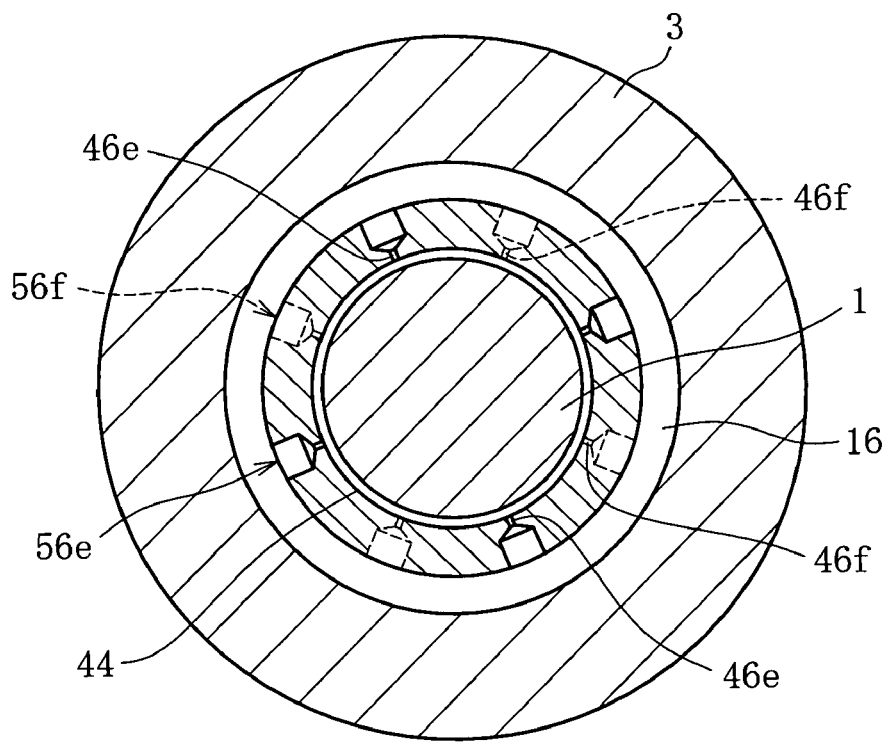
FIG. 7 is a sectional view taken along the line E—E in FIG. 3.
Figure 8:
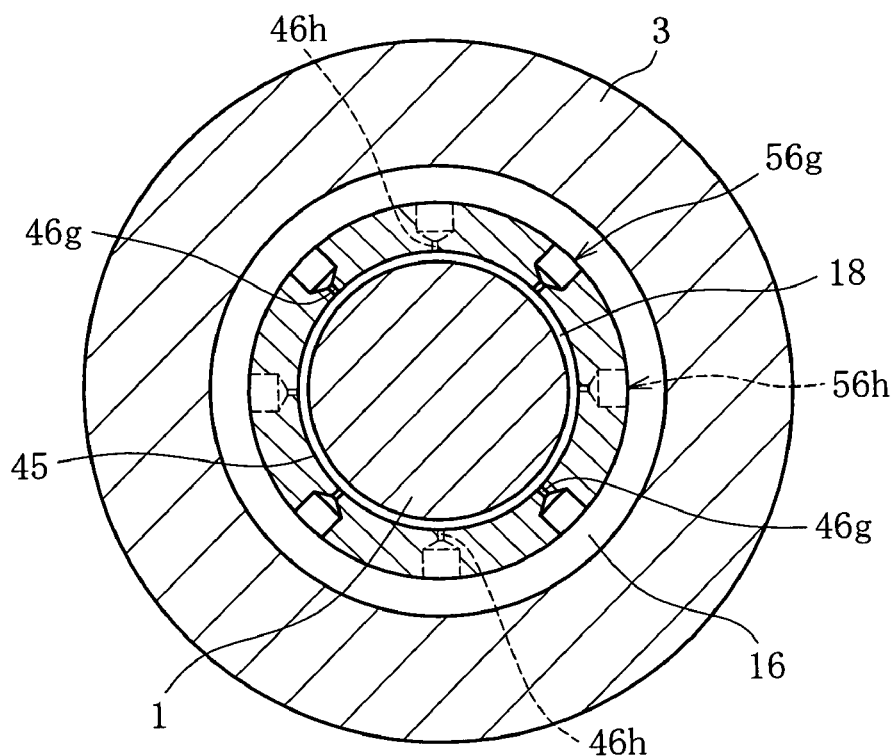
FIG. 8 is a sectional view taken along the line F—F in FIG. 3.

FIG. 4 shows another embodiment of the invention, wherein four journal bearing sections 42–45 are constituted by a bearing sleeve 50 that is a single bearing member. In this embodiment, gas feed holes 46a–46h in the four journal bearing sections 42–45 may be disposed as shown in FIGS. 5 through 8. The gas feed holes constituting the two gas feed rows 56a–56h in the journal bearing sections 42–45, that is, the gas feed holes 46a and 46b in the journal bearing section 42, the gas feed holes 46c and 46d in the journal bearing section 43, the gas feed holes 46e and 46f in the journal bearing section 44, and the gas feed holes 46g and 46h in the journal bearing section 45 are respectively shifted in phase (circumferential positions) by ½ of the circumferential distance of the adjoining gas feed hole, i.e., by 45°, and in the journal bearing sections 42 and 43, and in the journal bearing sections 44 and 45, the gas feed holes are shifted in phase (circumferential positions) by ½ of the preceding value, i.e., by 22.5°. Further, the journal bearing sections 42 and 45, and the journal bearing sections 43 and 44 have their gas feed holes disposed so that they are bilaterally symmetrical with respect to the axial middle of the bearing sleeve 50.

In the embodiment shown in FIG. 1, since the two journal bearing sections 7 and 8 are constituted of the separate bearing sleeves 4 and 5, respectively, in order to dispose the gas feed holes 31a–31d in the gas feed rows 41a–41d so that they are bilaterally symmetrical as seen in a direction normal to the axis, the operation of phasing the bearing sleeves 4 and 5 is required during assembly. In contrast thereto, if a plurality of journal bearing sections 42–45 are provided in the single bearing sleeve 50 as in the case of the embodiment shown in FIG. 4, then the phasing operation during assembly is unnecessary, with the advantage of the accuracy of circumferential disposition of the gas feed holes 46a–46h being improved.

In addition, suction passageways 47 are formed between journal bearing sections 42–45 of the bearing sleeve 50 and communicate with suction passageways 48 formed in the housing 3, so that the gas flowing out of the ends of the journal bearing sections 42–45 is discharged outside the spindle device through the suction passageways 47 and 48.

What is claimed is:

1. An externally pressurized gas bearing, comprising:
a main shaft, and
a plurality of journal bearing sections having a single bearing sleeve that have a plurality of gas feed rows each having a plurality of circumferentially equispaced gas feed holes, said gas feed holes in the gas feed rows being adapted to spout compressed gas to thereby rotatably radially support said main shaft in a non-contact state, said externally pressurized gas bearing being characterized in that said gas feed holes in the gas feed rows are staggered for each gas feed row so as to be positioned circumferentially intermediate between gas feed holes in the adjoining gas feed row, that the gas feed holes of the plurality of journal bearing sections are disposed such that they are bilaterally symmetrical with respect to an axial middle of the single bearing sleeve, and that all of the gas feed rows are formed in the single bearing sleeve.

2. An externally pressurized gas bearing as set forth in claim 1, characterized in that said gas feed holes in the gas feed rows are disposed in terms of their circumferential positions so that they are symmetrical on both sides of the middle in the direction of disposition of said gas feed rows.

3. An externally pressurized gas bearing as set forth in claim 2, characterized by including a thrust bearing section disposed in opposed relation to a thrust plate connected to said main shaft for axially supporting the main shaft.

4. A spindle device characterized by comprising an externally pressurized gas bearing as set forth in claim 3, and a driving source for rotating the main shaft of said externally pressurized gas bearing.

5. A spindle device characterized by comprising an externally pressurized gas bearing as set forth in claim 2, and a driving source for rotating the main shaft of said externally pressurized gas bearing.

6. An externally pressurized gas bearing as set forth in claim 1, characterized by including a thrust bearing section disposed in opposed relation to a thrust plate connected to said main shaft for axially supporting the main shaft.

7. A spindle device characterized by comprising an externally pressurized gas bearing as set forth in claim 6, and a driving source for rotating the main shaft of said externally pressurized gas bearing.

8. A spindle device characterized by comprising an externally pressurized gas bearing as set forth in claim 1, and a driving source for rotating the main shaft of said externally pressurized gas bearing.

* * * * *